United States Patent Office

3,438,954
Patented Apr. 15, 1969

3,438,954
POLYMERIZATION OF VINYL CHLORIDE IN THE PRESENCE OF CYCLOOLEFINES AS CHAIN-TRANSFER AGENTS
Gilbert Paul Christen, Lyon, and Michel Ruaud, Bron, Rhone, France, assignors to Rhone-Poulenc S.A., Paris, France, a French body corporate
No Drawing. Filed July 24, 1964, Ser. No. 385,062
Claims priority, application France, Aug. 21, 1963, 945,273
Int. Cl. C08f 1/80
U.S. Cl. 260—92.8                   11 Claims

ABSTRACT OF THE DISCLOSURE

Cycloolefines are advantageously used as chain-transfer agents in the polymerization of vinyl chloride at $-25°$ to $-5°$ C. in an aqueous saline solution containing a protective colloid and in the presence of a free radical-generating catalyst.

---

This invention relates to the production of polyvinyl chloride.

In patent application Ser. No. 252,323, filed Jan. 18, 1963, now Patent No. 3,260,711, we have described and claimed a process for the production of polyvinyl chloride which comprises polymerizing vinyl chloride at a temperature of $-25°$ to $-5°$ C. in the presence of a free radical-generating catalyst, e.g., trichloroacetyl peroxide, a protective colloid, and, optionally, a chain modifying agent (e.g., a halogenated hydrocarbon, an aldehyde, a mercaptan, or an alcohol), employing as the polymerization medium an aqueous solution of one or more mineral salts inert towards vinyl chloride, of concentration such that all the salt remains in solution at the polymerization temperature.

As important technological characteristic of polyvinyl chloride prepared in the cold is its viscosity index (the figures given herein were measured in accordance with the French AFNOR standard T 51,013). It is known that the value of this index depends upon certain operating conditions, more particularly upon the catalyst concentration is relation to the weight of vinyl chloride introduced and upon the concentration of the chain transfer agent, if any. It has been found that at a given polymerization temperature and with an autoclave of given dimensions, the viscosity index of the polyvinyl chloride decreases as the weight ratio of trichloroacetyl peroxide to vinyl chloride increases. Thus, for example, in a polymerization at $-10°$ C. in a 25 litre autoclave, the viscosity index of the polymer obtained decreases regularly from 480 to 210 when the catalyst concentration (expressed in grams of trichloroacetyl peroxide per 100 g. of vinyl chloride) increases from 0.36% to 1.44%. However, with catalyst concentrations higher than 1.44% the viscosity index only decreases very slowly. Thus, if the trichloroacetyl peroxide concentration is raised to 1.83%, the viscosity index decreases only from 210 to 180.

It will thus be seen that, in order to obtain polymers having a viscosity index between 80 and 200, which correspond to the mean molecular weights now required in industry, it is necessary to use relatively high proportions of trichloroacetyl peroxide, which is a disadvantage, since the manipulation of this reagent requires care, and, moreover, its use in high concentrations is likely to reduce the thermal stability of the polyvinyl chloride obtained.

While this disadvantage may be obviated, as stated in our aforesaid application, by adding certain known chain transfer agents, e.g., chloroform, to the polymerization medium, the chloroform, or other chain transfer agent, must be employed in substantial quantity, which in itself constitutes a serious disadvantage, since chloroform is relatively costly and cannot be fully recovered. Moreover, it has the disadvantage that it is imbibed by the polyvinyl chloride powder formed, which swells and is consequently difficult to dry.

It has now been found that the known chain transfer agents referred to in our aforesaid application may advantageously be replaced by cycloolefines and that very small quantities of the latter are sufficient to obtain a limitation of the viscosity index of polyvinyl chlorides to between 80 and 200.

This result was unexpected, because United States patent specifications Nos. 2,616,883 and 2,616,884 teach that, when vinyl chloride is polymerized by usual methods at temperatures between 40° C. and 60° C., the introduction of a small quantity of cyclomonoolefines or of conjugated diolefines at any time during the reaction short-steps the polymerization of the vinyl chloride.

The present invention accordingly consists in a process for the production of polyvinyl chloride, which comprises polymerizing vinyl chloride at a temperature of $-25°$ to $-5°$ C. in an aqueous solution containing a protective colloid and one or more mineral salts, inert towards vinyl chloride and at a concentration such that all the salt remains in solution at the polymerization temperature, in the presence of a free-radical generating catalyst and a cycloolefine.

The operating conditions for the new process are, except for the use of the cycloolefines as chain transfer agent, as described in our aforesaid application to which reference is made for a detailed description. Thus, the polymerization is preferably effected at $-20°$ to $-10°$ C. The protective colloid is preferably polyvinyl alcohol and the catalyst trichloroacetyl peroxide, conveniently formed in situ by the reaction of sodium peroxide and trichloroacetyl chloride at below $-5°$ C. The inert mineral salt is ordinarily a chloride or sulphate of an alkali metal or a chloride of an alkaline earth metal or a mixture of such salts, and it is preferred to use sodium chloride as an aqueous solution of concentration 15 to 23% by weight.

The amount of cycloolefine added to the reaction medium as chain transfer agent, before polymerization, is generally from 0.01% to 5%, preferably from 0.1% to 3%, calculated on the weight of vinyl chloride. Larger quantities could be added, but the viscosity index of the polyvinyl chlorides obtained would then be too low for most purposes.

The cycloolefines employed may be either monoolefinic as, for example, cyclohexene, methylcyclohexenes, cyclooctene, cyclododecene and norbornylene, or polyolefinic as, for example, bicyclopentadiene, cyclooctadiene-1,3 and cyclooctadiene-1,5, and trans-trans-trans- and trans-trans-cis-cyclododecatrienes-1,5,9. Cyclohexene, cyclooctadiene-1,3 and cyclooctadiene-1,5 are preferred.

The polyvinyl chlorides obtained by the new process have, in addition to other interesting properties, excellent stability to light and to heat, and are particularly useful in the manufacture of filaments and films.

The following examples illustrate the invention.

Example 1

Into an enameled 25 litre autoclave are charged: 12 litres of water, in which have been dissolved 23 g. of caustic soda, 120 g. of acid potassium phthalate, and 2570 g. of sodium chloride, to give a brine buffered at pH 5. The autoclave is purged with nitrogen, its contents are stirred and cooled to $-10°$ C., and 4900 g. of vinyl chloride, previously cooled to $-10°$ C., are introduced.

Via appropriate air locks and pumps, first 48 cc. of trichloroacetyl chloride, then two minutes later 18 g. of sodium peroxide, and 12 minutes later the transfer agent, are introduced. The nature and amount of the transfer agent are indicated in the following table. Finally, a solution, in 300 g. of water, of 18 g. of polyvinyl alcohol, having a saponification number of 125, and a viscosity, as a 4% aqueous solution, of 3 centipoises at 25° C., is injected.

With the stirrer rotating at 150 r.p.m., polymerization is carried out for 13 hours, 30 minutes at a temperature maintained between —9° and —11° C. When the operation has been completed, the autoclave is degassed, the reaction mass is extracted, and the polymer is washed, separated and dried. There is thus obtained fine-grained polyvinyl chloride in the weight and of the viscosity index shown in the following table:

TABLE

| Chain transfer agent | | | Polyvinyl chloride | | |
| --- | --- | --- | --- | --- | --- |
| Nature | Weight in g. | Content calculated on the vinyl chloride introduced in percent | Weight in g. | Extent of transformation, percent | Viscosity index |
| None | | 0 | 3,430 | 71 | 23 |
| Chloroform | 490 | 10 | 2,340 | 49 | 130 |
| Acetaldehyde | 392 | 8 | 2,680 | 56 | 120 |
| Cyclohexene | 84 | 1.7 | 2,230 | 46 | 130 |
| Cyclooctadiene-1,5 | 74 | 1.5 | 2,545 | 53 | 126 |
| Cyclooctadiene-1,3 | 15 | 0.3 | 1,980 | 41 | 123 |

It will be seen that, in order to obtain, instead of a polyvinyl chloride having a viscosity index of 235, as obtained in the absence of chain transfer agent, a polyvinyl chloride having a viscosity index between 120 and 130, a relatively small amount of cycloolefine (0.3% to 1.7%) is sufficient, while relatively much greater quantities of chloroform or acetaldehyde are required (8% to 10%).

Example 2

Into an enameled 25 litre autoclave are charged: 12 litres of water, in which there have been dissolved 23 g. of caustic soda, 120 g. of acid potassium phthalate, and 2570 g. of sodium chloride, which gives a brine buffered at pH 5. The autoclave is purged with nitrogen, its contents are stirred and cooled to —10° C. and 4900 g. of vinyl chloride (previously cooled to —10° C.) are injected. Via appropriate air locks and pumps, first 72 cc. of trichloroacetyl chloride, next, 2 minutes later, 27 g. of sodium peroxide, and then, 15 minutes later, 49 g. of cyclohexene (i.e., 1% by weight of the monomer subjected to the polymerization), are introduced. Finally, a solution, in 300 g. of water, of 18 g. of polyvinyl alcohol having a saponification number of 125 and a viscosity as a 4% aqueous solution of 3 centipoises at 25° C., is injected. With the stirrer rotating at 150 r.p.m., polymerization is carried out for 13½ hours at a temperature maintained between —9° and —11° C.

When the operation has been completed, the autoclave is degassed, the reaction mass is withdrawn and the polymer is washed, separated and dried. There are thus obtained 3136 g. of fine-grained polyvinyl chloride having an AFNOR viscosity index of 138 ml./g. The yield is 64%.

In order to achieve the same result with chloroform, the 49 g. of cyclohexene must be replaced by 400 g. of chloroform.

Example 3

The procedure of Example 2 is followed, but the cyclohexene is replaced by 10 g. of cyclooctadiene-1,3 (i.e., about 0.2% by weight of the monomer). The polyvinyl chloride, obtained in a yield of 60%, has an AFNOR viscosity index of 138 ml./g.

We claim:
1. A process for the production of polyvinyl chloride, which comprises polymerizing vinyl chloride at a temperature of —25° to —5° C. in an aqueous solution containing a protective colloid and at least one mineral salt, inert towards vinyl chloride and at a concentration such that all the salt remains in solution at the polymerization temperature, in the presence of trichloroacetyl peroxide as catalyst and a cycloolefine.

2. Process according to claim 1, wherein the amount of the said cycloolefine is 0.1 to 3% by weight of the vinyl chloride.

3. Process according to claim 2, wherein the cycloolefine is chosen from cyclohexene, cyclooctadiene-1,3 and cyclooctadiene-1,5.

4. Process according to claim 1, wherein the polymerization is effected at a temperature of —20° to —10° C.

5. Process according to claim 1, wherein the protective colloid is polyvinyl alcohol.

6. Process according to claim 1, wherein the trichloroacetyl peroxide is formed in situ from sodium peroxide and trichloroacetyl chloride at a temperature below —5° C.

7. Process according to claim 1, wherein the said inert mineral salt is a member selected from the class consisting of the chloride and sulphate of the alkali metals and the chlorides of the alkaline earth metals.

8. Process according to claim 7 in which the inert mineral salt is sodium chloride used as an aqueous solution of concentration 15 to 23% by weight.

9. A process for the production of polyvinyl chloride which comprises polymerizing vinyl chloride at a temperature of —25° to —5° C. in an aqueous solution containing polyvinyl alcohol as protective colloid, and an inert mineral salt selected from the class consisting of the chlorides and sulphates of the alkali metals and the chlorides of the alkaline earth metals at a concentration such that all the said salt remains in solution at the polymerization temperature, in the presence of trichloroacetyl peroxide as catalyst and 0.1 to 3% by weight of a cycloolefine.

10. A process for the production of polyvinyl chloride which comprises polymerizing vinyl chloride at a temperature of —25° to —5° C. in an aqueous solution containing polyvinyl alcohol as protective colloid, sodium chloride in a concentration of 15 to 25% by weight, in the presence of trichloroacetyl peroxide as catalyst and 0.1 to 3% by weight of a cycloolefine selected from the class consisting of cyclohexene, cyclooctadiene-1,3 and cyclooctadiene-1,5.

11. In a process for the production of polyvinyl chloride by the polymerization of vinyl chloride at —25° to —5° C. in the presence of trichloroacetyl peroxide as catalyst in an aqueous solution containing a protective colloid and at least one mineral salt inert to vinyl chloride and at a concentration such that the salt remains in solution at the polymerization temperature, the improvement which comprises adding a cycloolefine to the said solution as a chain transfer agent whereby polyvinyl chloride of viscosity index 80 to 200 is obtained.

References Cited

UNITED STATES PATENTS 2,616,883  11/1952  Marous _____ 260—92.8
2,616,884  11/1952  Marous _____ 260—92.8

JOSEPH L. SCHOFER, Primary Examiner.

J. A. DONAHUE, Assistant Examiner.

U.S. Cl. X.R.

260—88.2, 94.9